US012692056B1

(12) United States Patent
Alcantara

(10) Patent No.: US 12,692,056 B1
(45) Date of Patent: Jul. 28, 2026

(54) CORD KEEPER KIT

(71) Applicant: Adonay Pineda Alcantara, Westbury, NY (US)

(72) Inventor: Adonay Pineda Alcantara, Westbury, NY (US)

( * ) Notice: Subject to any disclaimer, the term of this patent is extended or adjusted under 35 U.S.C. 154(b) by 0 days.

(21) Appl. No.: 18/539,417

(22) Filed: Dec. 14, 2023

(51) Int. Cl.
*B65D 63/10* (2006.01)
*B65B 13/02* (2006.01)
*B65B 27/06* (2006.01)
*H01B 7/36* (2006.01)

(52) U.S. Cl.
CPC ............ *B65D 63/109* (2013.01); *B65B 13/02* (2013.01); *B65B 27/06* (2013.01); *B65D 63/1018* (2013.01); *H01B 7/368* (2013.01)

(58) Field of Classification Search
CPC ....... B65B 13/02; B65B 27/06; B65D 63/109; B65D 63/1018; H01B 7/368; B65H 75/34; B65H 75/366; B65H 2701/34
See application file for complete search history.

(56) References Cited

U.S. PATENT DOCUMENTS 435,930 A * 9/1890 Hamilton et al. . B65D 63/1018 24/17 A
2,929,161 A * 3/1960 Kuyk ..................... H01B 7/368 40/660
4,123,012 A 10/1978 Hough
4,268,986 A * 5/1981 Piana ................... C07D 231/16 40/661
4,586,675 A 5/1986 Brown
5,449,067 A 9/1995 Cannon
5,930,872 A * 8/1999 McBride ................. F16L 33/02 24/19
6,003,803 A 12/1999 Knapp et al.
7,188,814 B2 3/2007 Davis
8,413,306 B2 * 4/2013 Gallant .............. B65D 63/1018 24/446
9,334,141 B2 5/2016 Diekman
9,339,086 B2 * 5/2016 Hill ........................ B60P 7/0823
9,802,742 B1 * 10/2017 Castro ........................ F41B 3/02
10,154,713 B2 12/2018 Willingham
2007/0039912 A1 2/2007 Hinkens
2007/0056999 A1 3/2007 Kahn
2008/0083096 A1 * 4/2008 Wilkinson ............... H02G 3/30 24/298
2010/0061794 A1 * 3/2010 Sam ........................ B42F 13/10 24/19
2020/0040964 A1 * 2/2020 Foreman .............. B65D 63/109

* cited by examiner

*Primary Examiner* — Jason W San
*Assistant Examiner* — Louis A Mercado
(74) *Attorney, Agent, or Firm* — Cramer Patent & Design, PLLC.; Aaron R. Cramer

(57) ABSTRACT

A cord keeper kit for securing and organizing cords or cables. The kit includes a first strap with an aperture for receiving a fastener and a loop for securing the strap around a cord, and a second strap with an elastic portion, rigid middle portion, and support section. At least one cylindrical coupler, made of semi-flexible material, encloses a segment of the cord and includes interlocking fasteners along a seam to maintain closure. Integral sleeves on opposing sides of the coupler receive the first and second straps. When assembled, the straps and coupler cooperate to enclose and secure the cord, reducing tension and displacement.

2 Claims, 7 Drawing Sheets

CORD KEEPER KIT

RELATED APPLICATIONS

None.

FIELD OF THE DEVICE

The present device pertains to the field of cable management and organizational tools, specifically to a cord keeper kit designed to neatly bundle, store, and transport electrical cords and cables.

BACKGROUND OF THE DEVICE

The modern world is wired extensively, with electrical cords snaking behind desks, across floors, and through event stages, often leading to clutter and disorganization. Historically, cable management solutions have ranged from rudimentary ties and clips to more sophisticated track systems and organizational units. However, these solutions often fell short in versatility, ease of use, and durability. Users frequently contended with systems that were either overly complex or too simplistic to handle the variety of cord types and sizes encountered in day-to-day use.

Moreover, the growing consciousness around workplace safety has escalated the need for effective cord management systems. Loose and disorganized cables are not just an inconvenience but a significant trip hazard, which can lead to accidents and injuries. Additionally, improperly secured cables can suffer from wear and tear, leading to electrical hazards and costly equipment damage. There's also the issue of time efficiency; professionals in all sectors, from audio-visual technicians to office managers, require quick and reliable methods to deploy and store cables.

Aesthetics and identification add another layer of need. In settings where multiple cords are in use, such as in server rooms or during outdoor events, quickly identifying the right cable is crucial. Previous solutions did not adequately address the need for easily marking and identifying cords, often resorting to ad-hoc labels that could easily detach or become illegible over time. Furthermore, consumers and businesses alike have shown an increasing preference for cost-effective solutions that do not require constant replacement or frequent maintenance.

The development of the cord keeper kit has been driven by these multifaceted needs. This innovative product simplifies the task of cord management with a design that is adaptable to a wide range of sizes and types of cables, providing a robust and user-friendly solution. It improves safety by securely organizing cords, thereby reducing the risk of tripping and electrical hazards. The addition of customizable tags for easy identification streamlines the process of managing multiple cords and enhances the overall efficiency of the task at hand. Lastly, the durable materials and thoughtful design of the cord keeper kit ensure longevity and resilience, leading to a solution that is not only efficient but also cost-effective.

SUMMARY OF THE DEVICE

Embodiments of the present disclosure may include a cord keeper kit configured for securing a cord of variable diameters, the kit including a first linear strap component composed of a durable synthetic material, the strap including a unitary structure with a first end section, a parallel middle section forming a predetermined gap therebetween, and a second end section extending therefrom, each section being of a uniform width and the lengths of the end sections being substantially equivalent.

Embodiments may also include a second linear strap component of similar material to the first strap component, including an elastic first body for adjustable engagement, a rigid middle body, and a second body mirroring the length of the middle body for providing additional support, each section possessing a common width. Embodiments may also include at least one cylindrical coupler with a semi-flexible body capable of transitioning between an open configuration and a closed configuration to form an encasing tunnel suitable for snugly accommodating a cord bundle, the coupler featuring a zip tie-like closure mechanism involving multiple pairs of interlocking fasteners for securing the coupler in the closed configuration. Embodiments may also include a connection system integrated within the first and second strap components for reversible engagement with the at least one coupler, facilitating various configurations of the cord keeper kit.

In some embodiments, the strap components and couplers may be fabricated from materials featuring a combination of resilience, impermeability to water, resistance to fire, and suitability for extensive wear, ensuring the kit's longevity and reliability in various environmental conditions. In some embodiments, the first strap component may include a centrally disposed oval aperture within the first end section, the aperture dimensioned to allow passage of connecting hardware. Embodiments may also include an analogous oval aperture positioned within the second end section, mirroring the first in shape and size, adapted to accept a corresponding feature of the second strap component or the coupler. Embodiments may also include a contiguous sleeve at the terminal edge of the second end section, conformed to the width of the section, and providing an attachment point. Embodiments may also include a triangular clip securely fastened to the sleeve, offering a means of coupling with external elements or the coupler.

In some embodiments, the second strap component may be detailed with a tubular sleeve anchored to the extremity of the elastic first body, seamlessly extending the component's width. Embodiments may also include a buckle mechanism intricately connected to a first clip, the assembly affixed to the sleeve, enabling the adjustability and securement of the second strap component. Embodiments may also include a secondary tubular sleeve on the terminal end of the second body. Embodiments may also include a second clip linked to the secondary sleeve, furnishing an additional point of attachment for the kit's versatile assembly.

In some embodiments, the at least one coupler's body may include an array of three sets of fasteners, arrayed longitudinally along the seam of the coupler, designed to engage and disengage repeatedly without loss of grip. Embodiments may also include a sleeve oriented atop the first half of the coupler body, fabricated to serve as an anchoring point for the first strap component. Embodiments may also include a complementary sleeve positioned on the opposing half, structured to accept and retain the second strap component, ensuring the kit's assembly integrity.

In some embodiments, the cord keeper kit, further enhanced by a detachable tag, the tag featuring a flat body marked with customizable indicia for identification, and an integral clip for temporary attachment to the coupler's first sleeve. Embodiments may also include a connector piece inclusive of a clasp and an associated clip, the connector enabling linkage to the coupler's second sleeve, and providing expanded configurability and utility of the cord keeper kit.

In some embodiments, the tag and connector may be engineered for insertion and securement through the respective sleeves of the coupler, providing a reliable method of affixation and easy retrieval for identification and extended functionality. In some embodiments, the cord keeper kit, purposely designed for effective management of cables and cords to mitigate tension, preserve electrical connection integrity, and support associated tools or equipment, encompassing utilization in organizational, storage, and transport scenarios.

Embodiments may also include a method of employing the cord keeper kit, involving steps of wrapping the at least one coupler around a cord at a chosen segment to establish a foundational anchor point. Embodiments may also include linking the first strap component to the coupler via the clip and sleeve mechanism. Embodiments may also include encircling a segment of the cord with the second strap component to form a secure loop. Embodiments may also include locking the adjustable buckle of the second strap component into a receiving aperture of the first strap component, achieving a comprehensive securing system.

In some embodiments, the method may include additional steps of utilizing a secondary coupler to encompass the cord at another section for further stabilization. Embodiments may also include attaching the tag to the primary sleeve of the secondary coupler for visual differentiation. Embodiments may also include affixing the connector to the complementary sleeve of the secondary coupler for enhanced consolidation.

In some embodiments, the method may be adaptable for a variety of applications such as securing bundled cords, joining two cords at an electrical juncture, or organizing cords in a non-bundled arrangement, offering a multiplicity of uses and arrangements.

BRIEF DESCRIPTION OF THE DRAWINGS

The advantages and features of the present disclosure will become better understood with reference to the following more detailed description and claims taken in conjunction with the accompanying drawings, in which like elements are identified with like symbols and like reference numerals represent similar or like parts, and in which:

DESCRIPTIVE KEY

Figure 1:
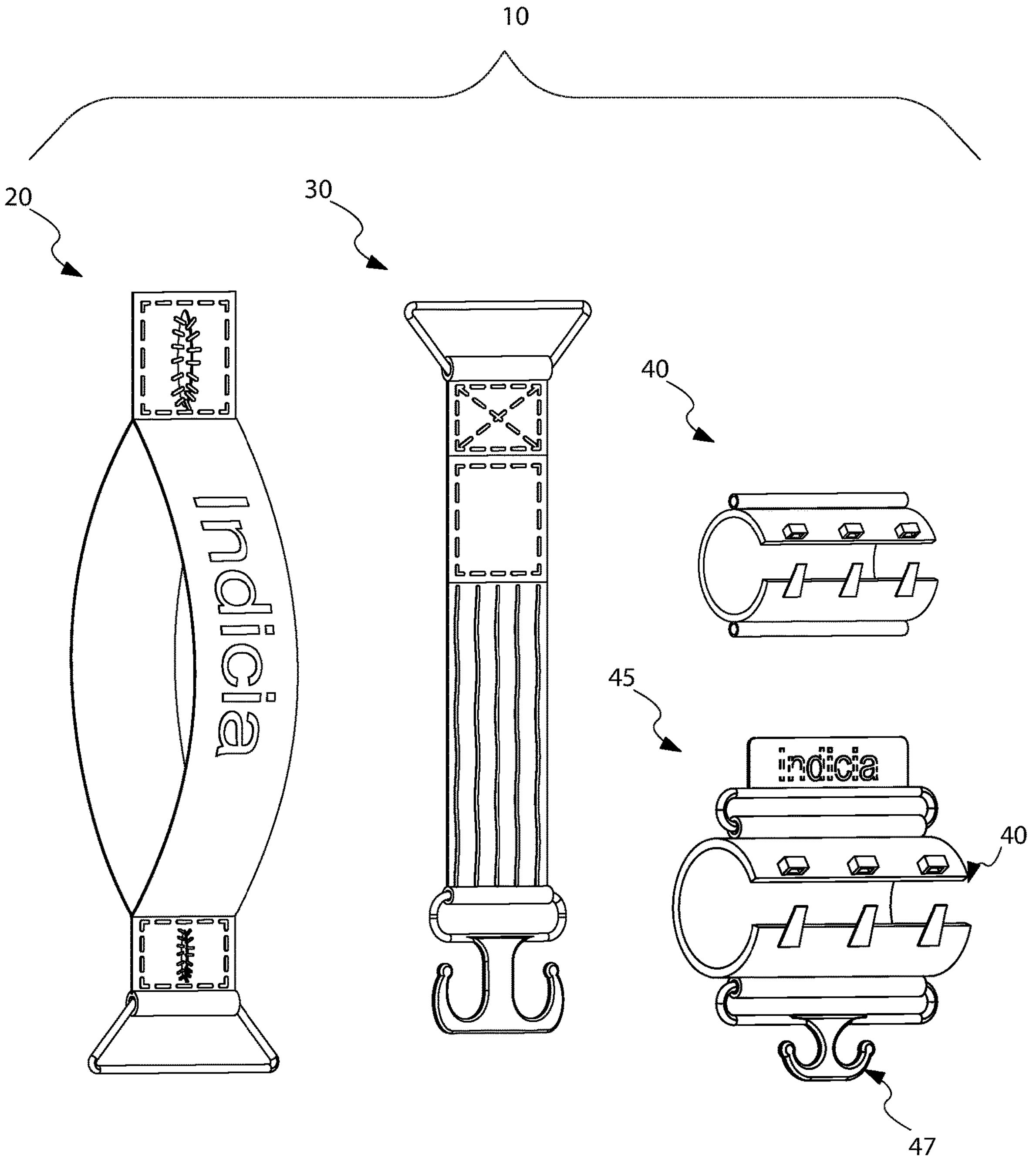
FIG. 1 is a front perspective view of a of a cord keeper kit 10 in a disassembled state, including a first component 20, a second component 30, a coupler 40, and another coupler 40 further having an attached tag 45 and an attached clip connector 47, according to the preferred embodiment of the present device.

10 cord keeper kit
11 first method of use
12 second method of use
13 third method of use
20 first component
21 first component first body
22*a* first component middle body first section
22*b* first component middle body second section
23 first component second body
24 first component first aperture
25 first component second aperture
26 first component sleeve
27 first component clip
28 gap
30 second component
31 second component first body
32 second component middle body
33 second component second body
34 second component first sleeve
35 second component first clip
36 second component buckle
37 second component second sleeve
38 second component second clip
40 coupler
41*a* coupler body
41*b* coupler tunnel
42*a* coupler first half
42*b* coupler second half
43*a* coupler first fastener
43*b* coupler second fastener
44*a* coupler first sleeve
44*b* coupler second sleeve
45 tag
46*a* tag clip
46*b* tag body
47 coupler connector
48*a* coupler connector clip
48*b* coupler connector buckle
50 cord

DETAILED DESCRIPTION OF THE PREFERRED EMBODIMENT

Figure 7A:
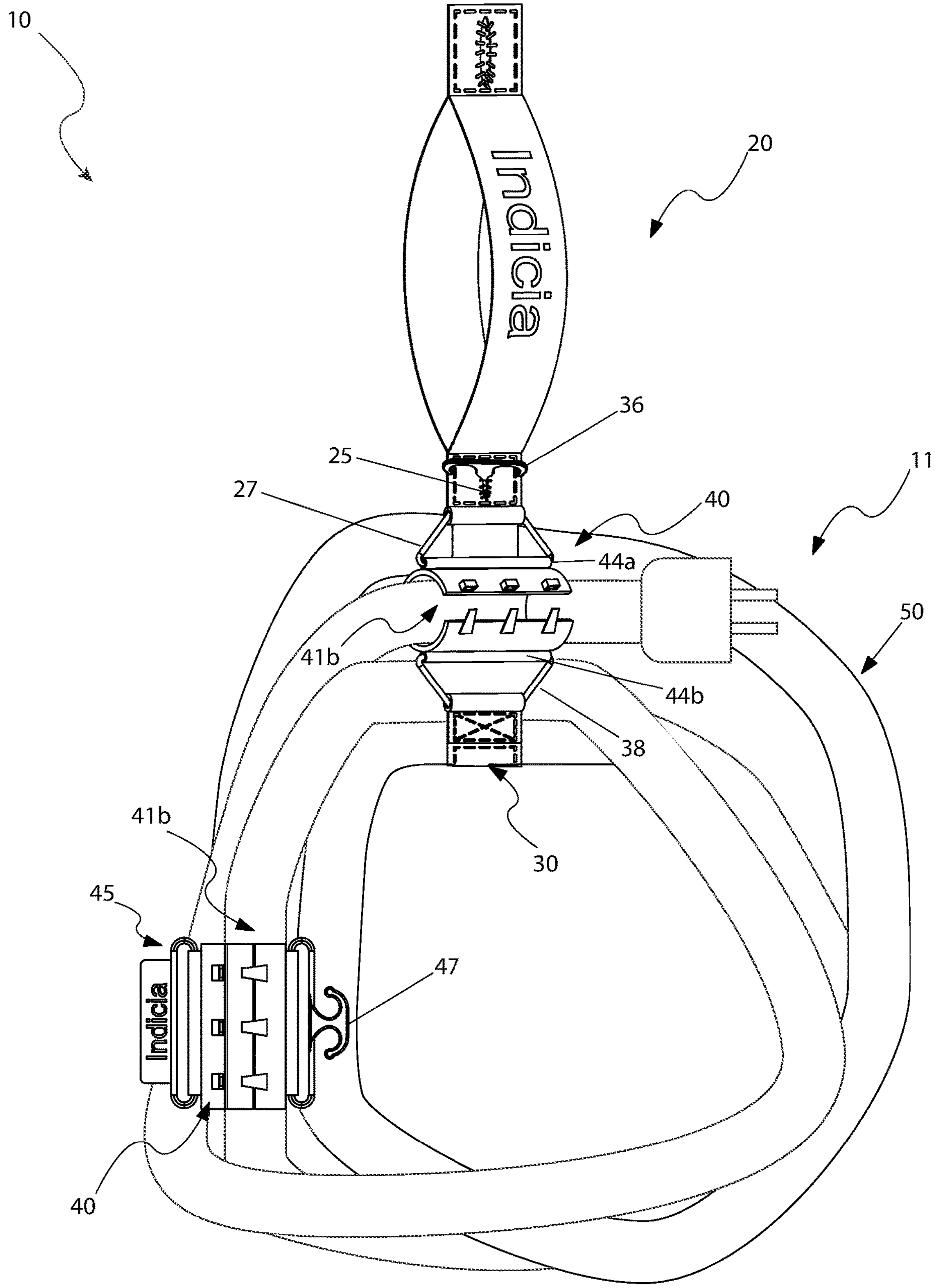
FIG. 7*a* is an environmental top perspective view of the cord keeper kit 10, according to a first method of use 11 preferred embodiment of the present device.
Figure 7B:
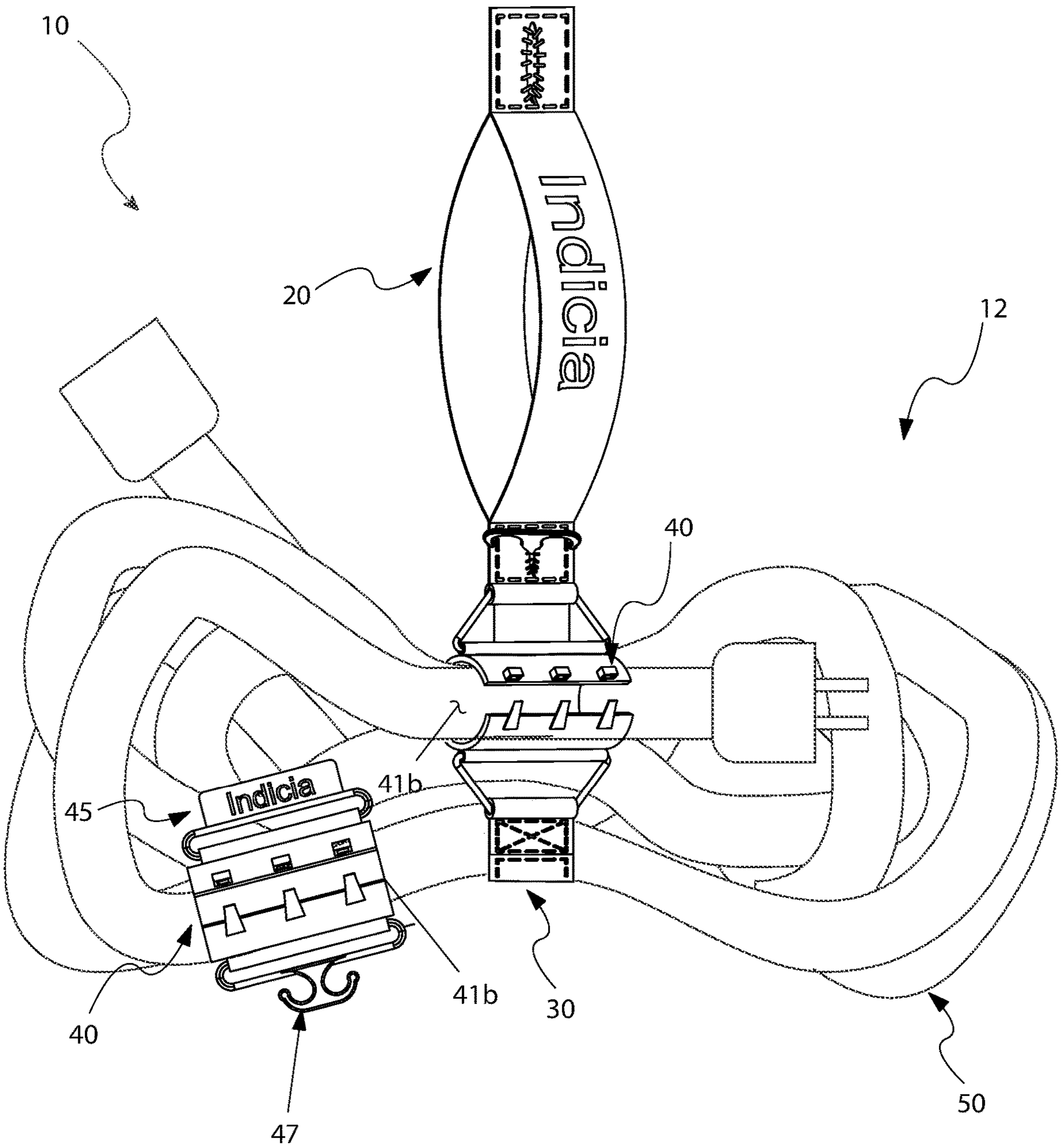
FIG. 7*b* is an environmental top perspective view of the cord keeper kit 10, according to a second method 12 of use preferred embodiment of the present device; and, FIG. 7*c* is an environmental top perspective view of the cord keeper kit 10, according to a third method of use 13 preferred embodiment of the present device.
Figure 7C:
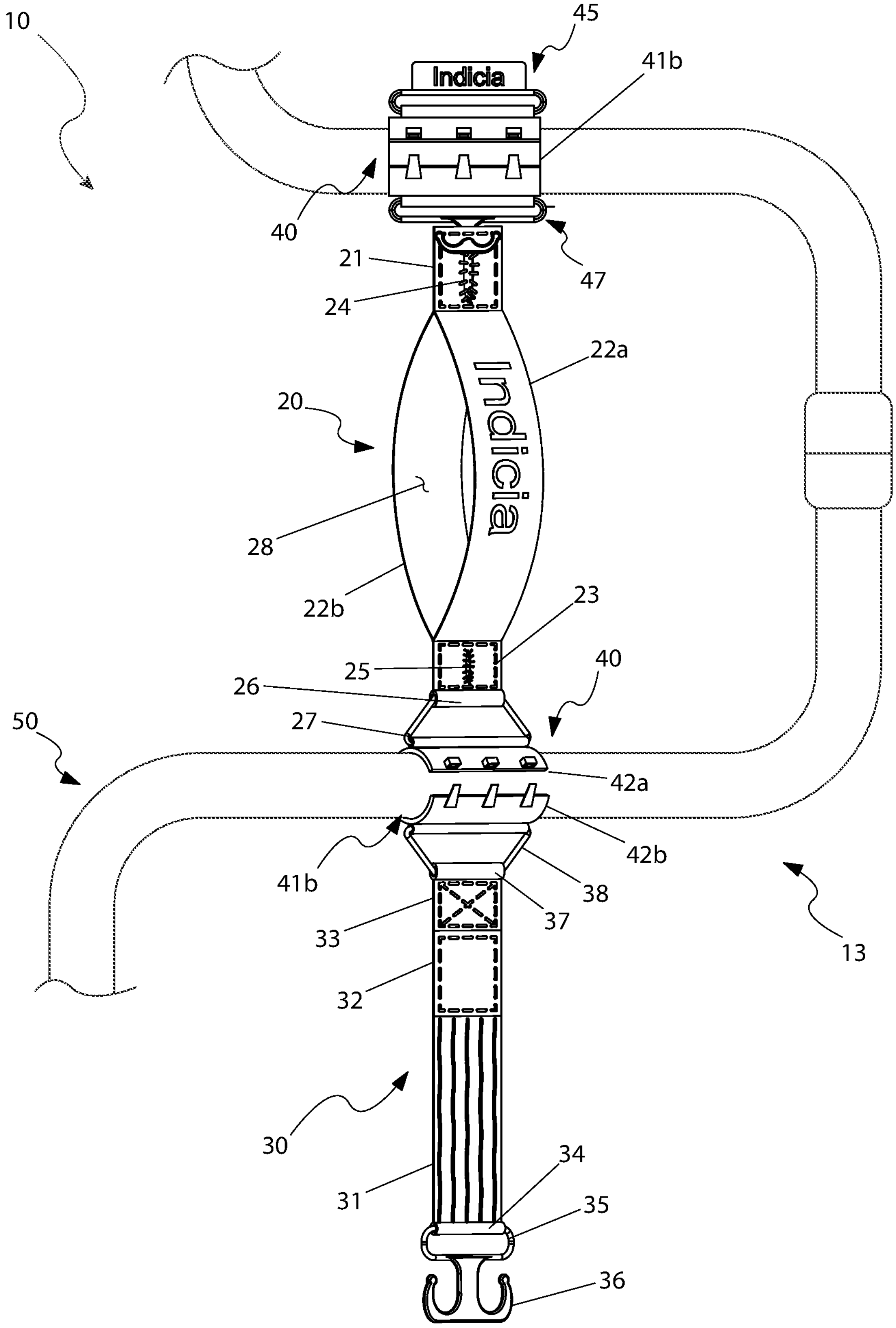

Referring now to FIG. 1, it is illustrated herein a cord keeper kit 10 that includes various components to enable a cord 50 of various diameters and lengths to be securely bundled for either transportation or storage in a neat and tidy manner as seen in a first method of use 11 as seen in FIG. 7*a*, a second method of use 12 as seen in FIG. 7*b*, and a third method of use 13 as seen in FIG. 7*c*, although other methods of use are contemplated. The cord keeper kit 10 also includes a tag 45 that is able to display customizable indicia to provide ease of identification if more than one (1) cord keeper kit 10 is being used or stored in close proximity to each other. The cord keeper kit 10 is particularly suited for organizing and maintaining cords 50 and any equipment or tools they service and may assist in providing stain tension relief and promote a secure electrical connection.

In order to achieve these benefits, the cord keeper kit 10 can include a first component 20, a second component 30, and at least one (1) coupler 40. The coupler 40 may further have a tag 45 and a coupler connector 47 affixed thereto to enable a more customized usage. The first component 20 and second component 30 are generally speaking elastic or rigid linear straps comprising a synthetic or natural material to enable suspension from a support structure or grasping by a user. Each coupler 40 may have means to encircle and removably secure to a portion of the cord 50, such means may preferably be a permanent attachment. The first component 20, second component 30, and at least one (1) coupler 40, with or without any tags 45 or coupler connectors 47, can be interconnected to each other to affect a configuration that may be useful. The tags 45 assist in providing a visual indication of a cord 50 or other item, ownership, etc. as bundled by the cord keeper kit 10.

Figure 2:
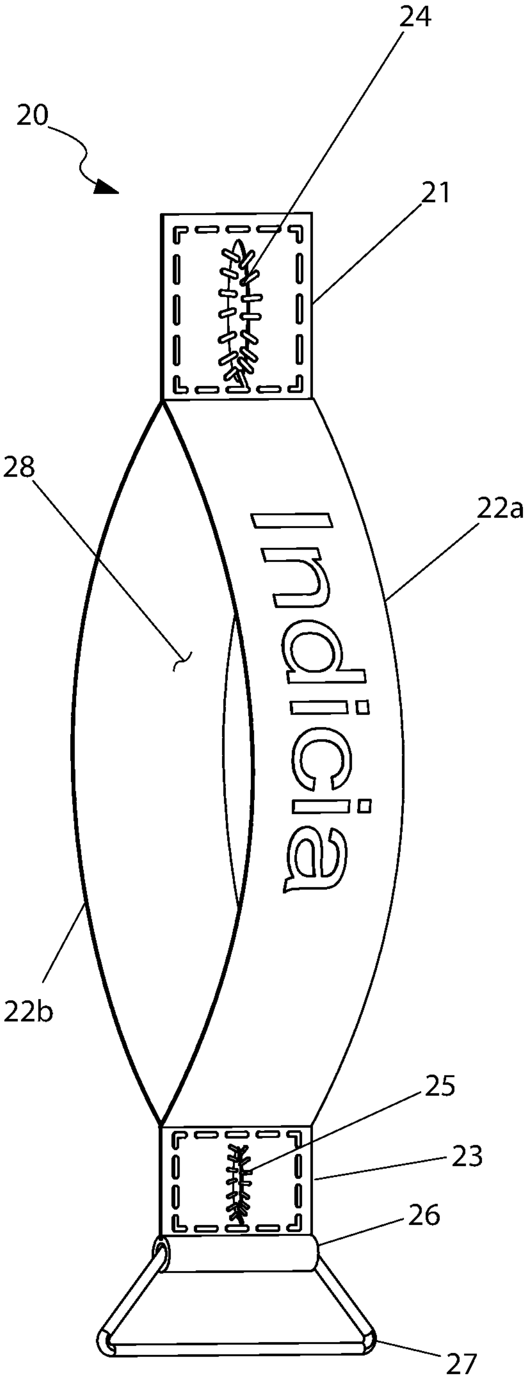
FIG. 2 is a front perspective view of the first component 20, according to the preferred embodiment of the present device.

Referring now to FIG. 2, the first component 20 is shown in more detail in a perspective view thereof. The first component 20 generally comprises a first component first body 21, a first component middle body first section 22*a* that has a first end affixed to and extending away from a first end of the first component first body 21, a first component middle body second section 22*b* that has a first end also affixed to and extending away from a first end of the first component first body 21 and oriented generally parallel with the first component middle body first section 22*a*, and a first component second body 23 having a first end affixed to and extending away from second ends of the first component middle body first section 22*a* and first component middle body second section 22*b*. A gap 28 can be defined as the general spatial area between the first component middle body first section 22*a* and the first component middle body second section 22*b*.

In at least one (1) embodiment, the first component first body 21, the first component middle body first section 22*a*, first component middle body second section 22*b*, and first component second body 23 may have a common continuous width. The length of the first component first body 21 and first component second body 23 are generally approximately equivalent. The first component middle body first section 22*a* and the first component middle body second section 22*b* have a common length, which is approximately three to four times (3-4×) the common length of the first component first body 21 and first component second body 23.

Centrally located and along a bisecting axial centerline of the first component first body 21 is an oval-shaped first component first aperture 24. Centrally located and along a bisecting axial centerline of the first component second body 23 is an oval-shaped component second aperture 25. The first component first aperture 24 and first component second aperture 25 have a size and shape capable of removably securing a feature of the second component 30 or the clip 40 therein. Located at a second end of the first component second body 23 is a first component sleeve 26, generally fashioned a tubular sleeve continuous with the width of the second end of the first component second body 23. A triangular-shaped first component clip 27 is affixed to the first component sleeve 26, either permanently or removably. In at least one (1) embodiment, a portion of the first component clip 27 is routed through the first component sleeve 26 such that it is secured thereto.

Descriptive information may be located on an outer or visible surface of either the first component middle body first section 22*a* and/or the first component middle body second section 22*b*. Decorative stitching may be used as a joining method for the first component first body 21, first component middle body first section 22*a*, first component middle body second section 22*b*, and first component second body 23 together to provide a unitary construction. The materials of any or all of the first component first body 21, first component middle body first section 22*a*, first component middle body second section 22*b*, and first component second body 23 may be resilient, waterproof, fire-retardant, and capable of rugged use.

Figure 3:
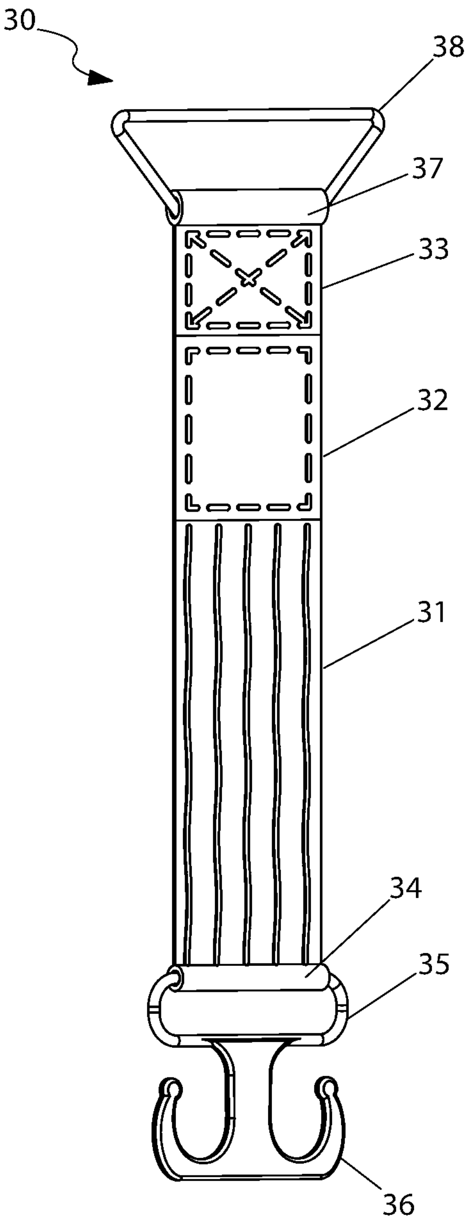
FIG. 3 is a front perspective view of the second component 30, according to the preferred embodiment of the present device.

Referring now to FIG. 3, the second component 30 is shown in more detail in a perspective view thereof. The second component 30 generally comprises a second component first body 31, a second component middle body 32 that has a first end affixed to and extending away from a first end of the second component first body 31, and a second component second body 33 having a first end affixed to and extending away from a second end of the second component middle body 32. In at least one (1) embodiment, the second component first body 31, the second component middle body 32, and second component second body 33 may have a common continuous width. The length of the second component middle body 32 and second component second body 33 are generally approximately equivalent. The second component first body 31 may be elastic in nature in order to provide continuous length adjustment relative to the second component middle body 32 and second component second body 33. The second component first body 31 has a length approximately two times (2×) the length of the common length of the second component middle body 32 and second component second body 33.

Located at a second end of the second component first body 31 is a second component first sleeve 34, generally fashioned a tubular sleeve continuous with the width of the second end of the second component first body 31. A second component buckle 36 is affixed or integrally formed with a second component first clip 35 which is either permanently or removably attached to the second component first sleeve 34. In at least one (1) embodiment, a portion of the second component first clip 35 is routed through the second component first sleeve 34 such that it is secured thereto. Located at a second end of the second component second body 33 is a second component second sleeve 37, generally fashioned a tubular sleeve continuous with the width of the second end of the second component second body 33. A second component second clip 38 is affixed to the second component second sleeve 37 either permanently or removably attached thereto. In at least one (1) embodiment, a portion of the second component first clip 35 is routed through the second component first sleeve 34 such that it is secured thereto.

Decorative stitching may be used as a joining method for the second component first body 31, second component middle body 32, and second component second body 33 together to provide a unitary construction. The materials of any or all of the second component first body 31, second component middle body 32, and second component second body 33 may be resilient, waterproof, fire-retardant, and capable of rugged use.

Figure 4:
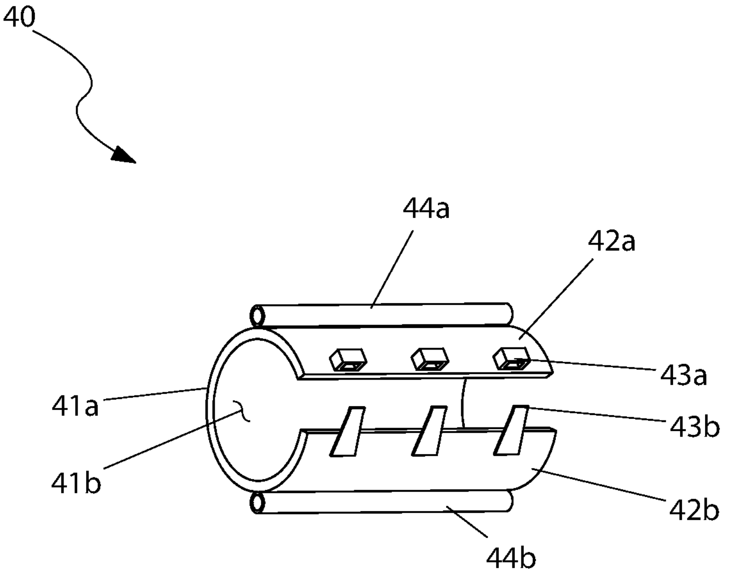
FIG. 4 is a perspective view of the coupler 40, according to the preferred embodiment of the present device.

Referring now to FIG. 4, there is shown a coupler 40 in a perspective view. The coupler 40 has a coupler body 41*a* that may be selectively manipulated between a closed state to create a coupler tunnel 41*b* and an open state. The coupler

40 has a general overall shape of a hollow cylindrical tubular-shaped construction having an inner diameter to create the coupler tunnel 41*b* sized and shaped to enable a cord bundle 50 to be securely clamped therein, and an overall width approximately two times (2×) the length. The coupler body 41*a* has a first end, a second end, and a seam running perpendicular to the first end and second end and along a linear centerline. A coupler first half 42*a* has a first end located on the coupler body 41*a* at a diametrically opposing position from the seam and a second end located at the seam. A coupler second half 42*b* has a first end located on the coupler body 41*a* at a diametrically opposing position from the seam coextensive with the first end of the coupler first half 42*a* and a second end located at the seam opposite the second end of the coupler first half 42*a*. Located on the coupler first half 42*a* adjacent the seam is a coupler first fastener 43*a* and located on the coupler second half 42*b* adjacent the seam is a coupler second fastener 43*b*. The coupler first fastener 43*a* and coupler second fastener 43*b* are capable of removably joining to each other to create the closed state of the coupler body 41*a* and create the coupler tunnel 41*b*. Such coupler fasteners 43*a*, 43*b* may be complementary joining members of a zip tie. In at least one (1) embodiment, there are three (3) pairs of fasteners 43*a*, 43*b*.

Located at a top side of the coupler first half 42*a* (e.g., halfway between the first end and second end of the coupler first half 42*a*) is a coupler first sleeve 44*a*, generally fashioned a tubular sleeve continuous with the width of the top side of the coupler first half 42*a*. Located at a bottom side of the coupler second half 42*b* (e.g., halfway between the first end and second end of the coupler second half 42*b*) is a coupler second sleeve 44*b*, generally fashioned a tubular sleeve continuous with the width of the bottom side of the coupler second half 42*b*.

Figure 5:
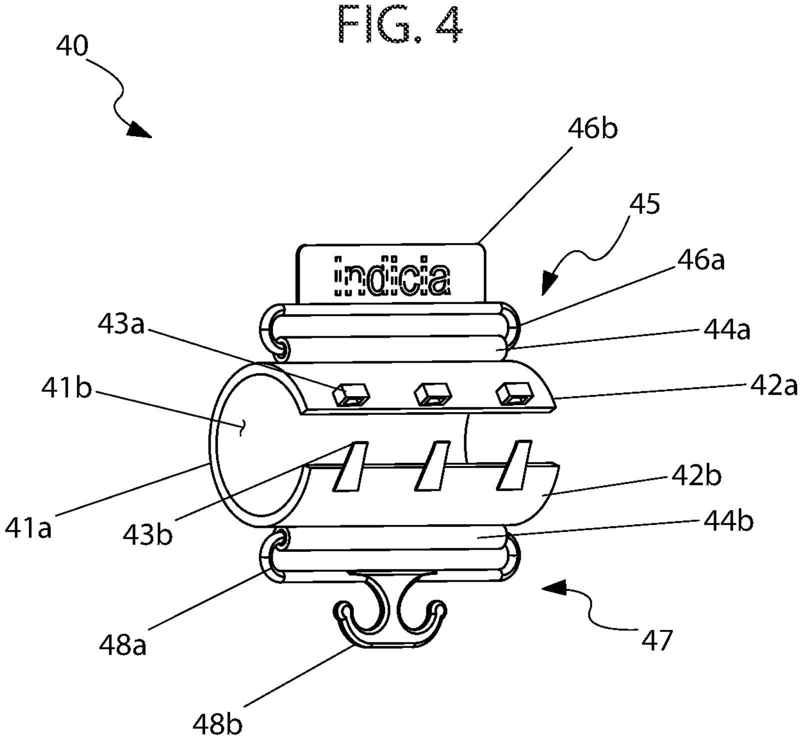
FIG. 5 is a perspective view of the coupler 40 with the tag 45 and the clip connector 47 attached thereto, according to the preferred embodiment of the present device.

Referring now more closely to FIG. 5, which illustrates a coupler 40 that has a tag 45 removably attached to the coupler first half 42*a* and a coupler connector 47. The tag 45 includes a tag body 46*b* affixed or integrally formed with a tag clip 46*a* which can be either permanently or removably attached to the coupler first sleeve 44*a*. Descriptive information may be located on an outer or visible surface of the tag body 46*b*, which may be a thin construction slightly less in width than the tag clip 46*a*. In at least one (1) embodiment, a portion of the tag clip 46*a* is configured to be routed through the coupler first sleeve 44*a* such that it is secured thereto. The coupler connector 47 includes a coupler connector buckle 48*b* affixed or integrally formed with a coupler connector clip 48*a* which can be either permanently or removably attached to the coupler second sleeve 44*b*. In at least one (1) embodiment, a portion of the coupler connector clip 48*a* is configured to be routed through the coupler second sleeve 44*b* such that it is secured thereto.

Figure 6:
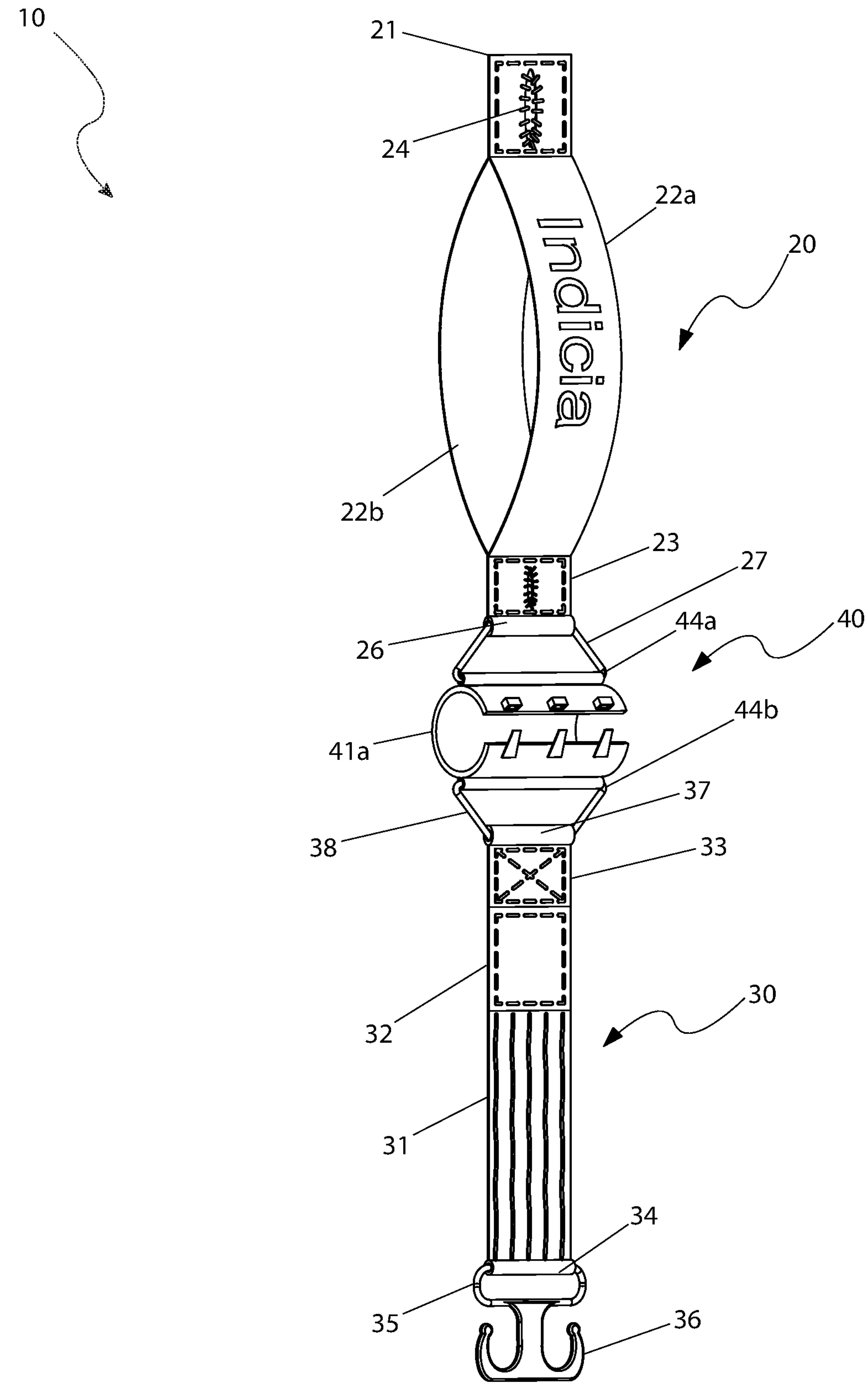
FIG. 6 is a perspective view of elements of the cord keeper kit 10 in an assembled state including the first component 20, the second component 30, and the clip 40, according to the preferred embodiment of the present device.

FIG. 6 describes an exemplary method of use of the cord keeper kit 10, wherein the first component 20 is attached to a coupler first sleeve 44*a* and the second component 30 attached to the coupler second sleeve 44*b*.

FIG. 7*a* describes another exemplary method of use of the cord keeper kit 10 particularly suitable to a first method of use 11, wherein a cord 50 is bundled in an encircling configuration. The cord keeper kit 10 is employed where the coupler tunnel 41*b* of a first coupler 40 encircles a cord 50 at a first location. The first component clip 27 is attached to the coupler first sleeve 44*a*. The second component second clip 38 is attached to the coupler second sleeve 44*b*. The second component 30 encircles a portion of a bundle cord 50 about the first location and the second component buckle 36 is inserted into the first component second aperture 25. The coupler tunnel 41*b* of a second coupler 40 encircles a cord 50 at a second location. A tag 45 is attached to the coupler first sleeve 44*a* of the second coupler 40 and a coupler connector 47 is attached to the coupler second sleeve 44*b* of the second coupler 40.

FIG. 7*b* describes another exemplary method of use of the cord keeper kit 10 particularly suitable to a second method of use 12, wherein a cord 50 is bundled in another encircling configuration, the cord keeper kit 10 is employed show herein in a similar fashion as that illustrated in FIG. 7*a*.

FIG. 7*c* describes another exemplary embodiment of the cord keeper kit 10 particularly suited to a third method of use 13, wherein a cord 50 is not bundled. The cord keeper kit 10 is employed where the coupler tunnel 41*b* of a first coupler 40 encircles a cord 50 at a first location and the coupler tunnel 41*b* of a second coupler 40 encircles a different cord 50 at a second location. Such a third method of use 13 may be joining two (2) cords on either side of an electrical splice or plug and socket. A tag 45 is attached to the coupler first sleeve 44*a* of the first coupler 40. A coupler connector 47 is attached to the coupler second sleeve 44*b* of the first coupler 40. A coupler connector buckle 48*b* is routed through and secured to a first component first aperture 24 of the first component 20. The first component clip 27 is connected to the coupler first sleeve 44*a* of the second coupler 40. The second component second clip 38 is attached to the coupler second sleeve 44*b*.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. A cord keeper kit, comprising:

a first strap formed of a durable synthetic material, the first strap including:
- a first end section with an aperture dimensioned to allow passage of connecting hardware;
- a middle section extending parallel to a cord when assembled; and,
- a second end section with a contiguous sleeve providing an attachment point; and, a second strap formed of the same durable synthetic material as the first strap, the second strap including:
- a first elastic body for adjustable engagement with the cord;
- a rigid middle body extending from the first elastic body; and,
- a second body having a first end affixed to and extending away from a second end of the rigid middle body and providing additional support, the second body including a tubular sleeve and an attached clip for securing the second strap to the cord; and, at least one cylindrical coupler formed of a semi-flexible material, the coupler being transitionable between an open configuration and a closed configuration to enclose a segment of the cord, the coupler including:
- an array of interlocking fasteners positioned along a seam of the coupler for securing the closed configuration;
- a first sleeve located on a first half of the coupler, the first sleeve fabricated to serve as an anchoring point for the first strap, the first sleeve configured to receive the first strap therein; and, a second sleeve located on an opposing half of the coupler, the second sleeve structured to accept and retain the second strap therein; and, wherein, when assembled, the first strap is connected to the first sleeve, the second strap is connected to the second sleeve, and the first strap, the second strap, and the at least one coupler cooperate to secure the cord and mitigate tension on the cord.

2. The cord keeper kit of claim 1, further comprising:

a detachable tag including a flat body with customizable indicia and a clip configured to removably attach the tag to the first sleeve of the coupler; and, a connector piece including a clasp and a clip configured to removably attach the connector piece to the second sleeve of the coupler.

* * * * *